United States Patent Office 3,005,608
Patented Oct. 24, 1961

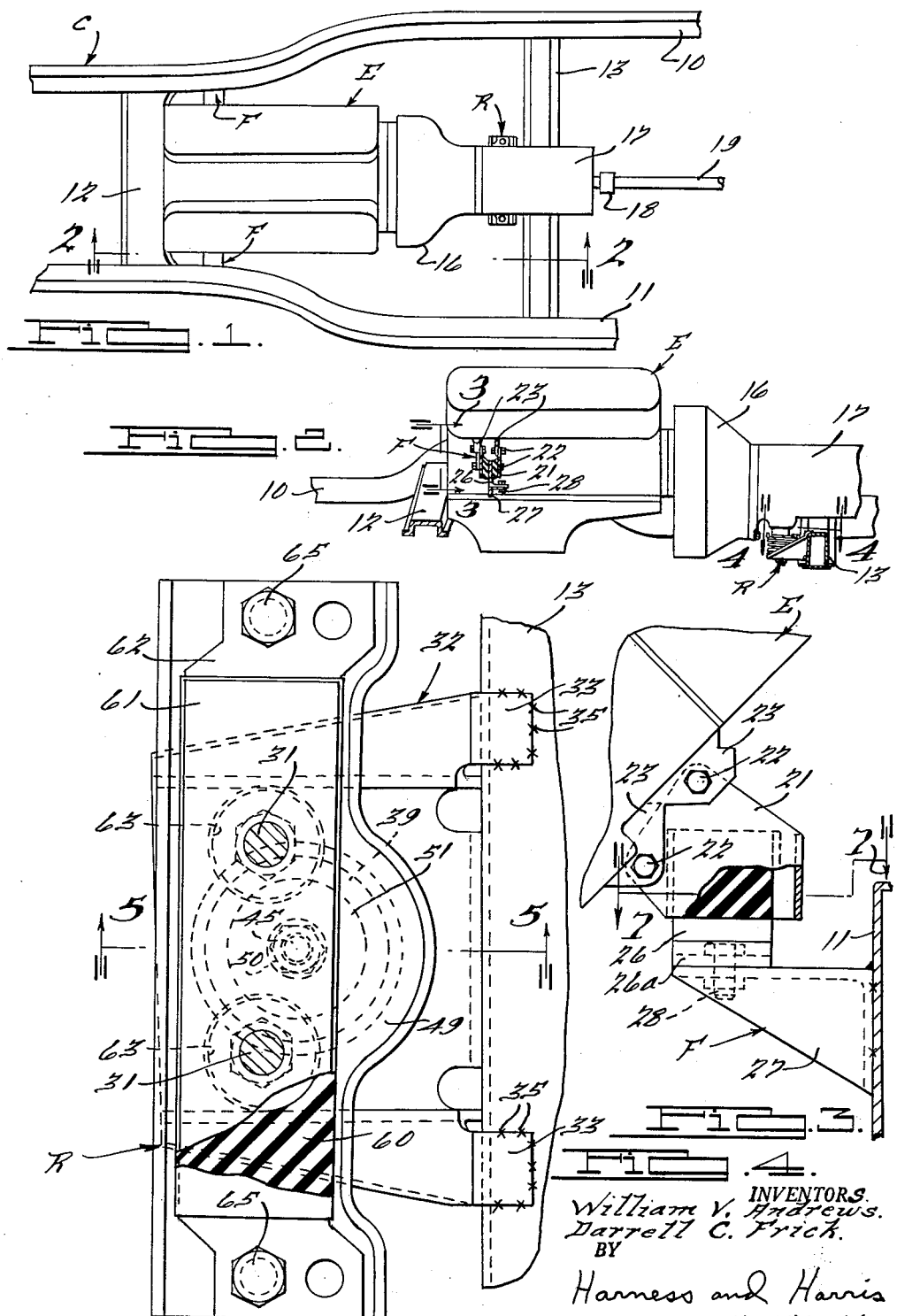

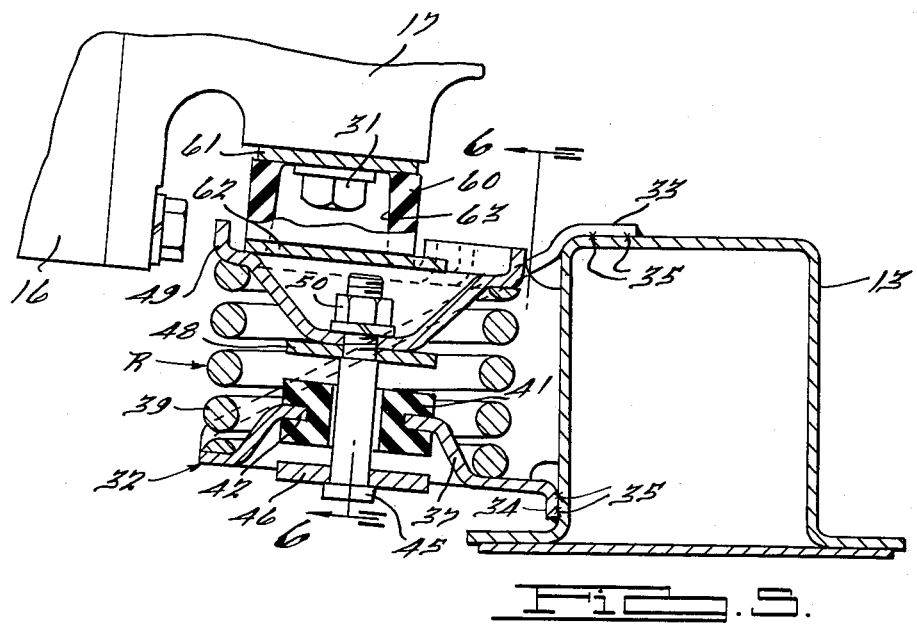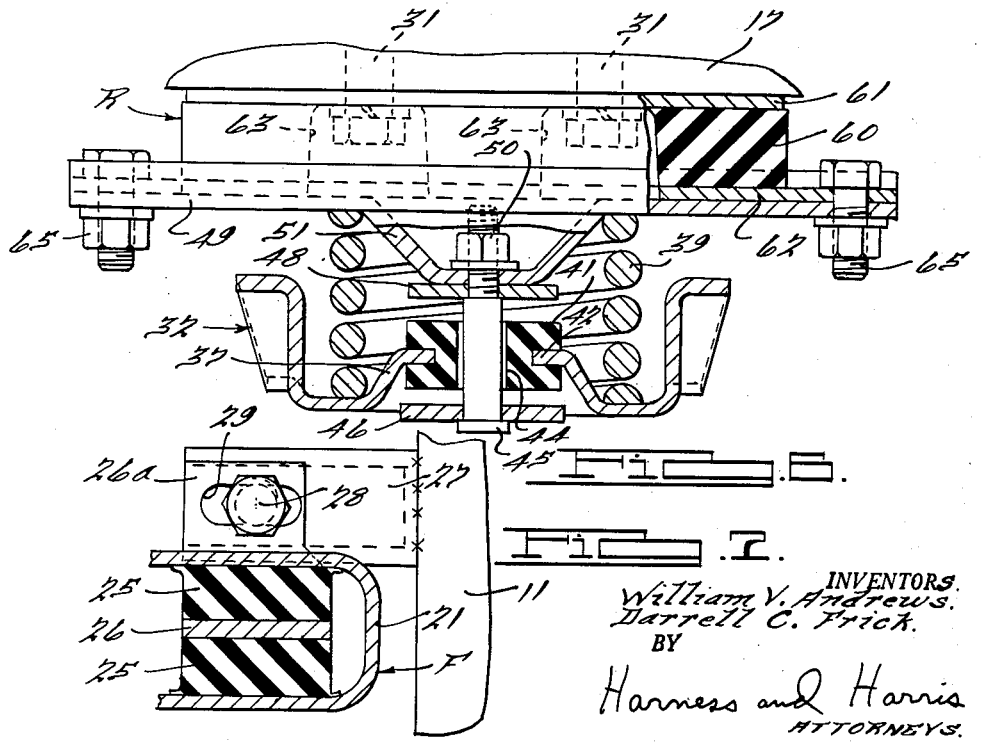

3,005,608
ENGINE MOUNT
William V. Andrews, Riverside, Ontario, Canada, and Darrell C. Frick, Detroit, Mich., assignors to Chrysler Corporation, Highland Park, Mich., a corporation of Delaware
Filed Apr. 2, 1959, Ser. No. 803,645
5 Claims. (Cl. 248—8)

This invention relates to machinery vibration damping mounts and particularly to mounts of this type adapted for support of motor vehicle engines.

It is a primary object of this invention to provide a rear mount for a motor vehicle engine comprising a resilient block of rubber-like material arranged in series with a heavy coiled compression spring so as to provide an improved vibration damping mount for the rear end portion of a motor vehicle power plant and drive transmission unit.

It is another object of this invention to provide a motor vehicle rear engine mount composed of a series arranged rubber-like block and a compression spring wherein the spring allows the engine to pitch freely within a limited range of movement to absorb low frequency drive train vibrations which originate at highway cruising speeds and to suppress other vibrations emanating from the power plant at low car speeds while the rubber block element of the mount absorbs high frequency vibrations.

It is still another object of this invention to combine the series arranged resilient block and coil spring rear engine mount with an improved shear-type front engine mount to provide an improved engine mounting system.

Other objects and advantages of this invention will be readily apparent from a reading of the following description and a consideration of the related drawings wherein:

FIG. 1 is a fragmentary top plan elevational view of the front end of a motor vehicle chassis having engine mounts embodying this invention;

FIG. 2 is a fragmentary side elevational view, partly in section, of the chassis structure shown in FIG. 1, the view being taken along the line 2—2;

FIG. 3 is an enlarged, fragmentary, sectional view of one of the front engine mounts, the view being taken along the line 3—3 of FIG. 2;

FIG. 4 is another enlarged, fragmentary, sectional elevational view of the rear engine mount, the view being taken along the line 4—4 of FIG. 2;

FIG. 5 is another enlarged, fragmentary, sectional elevational view of the rear engine mount, the view being taken along the line 5—5 of FIG. 4;

FIG. 6 is another enlarged, fragmentary, sectional elevational view of the rear engine mount, the view being taken along the line 6—6 of FIG. 5; and FIG. 7 is still another enlarged, fragmentary, sectional elevational view of one of the front engine mounts, the view being taken along the line 7—7 of FIG. 3.

The engine mounting system disclosed in the drawings has been found to adequately damp out both the high and the low frequency vibrations and noises that tend to develop during the wide range of engine speeds utilized during present day motor vehicle operation. While certain of the component parts of this engine mounting system have been used in prior practice, it is thought that the complete engine mounting system shown and described is new and represents the exercise of inventive ingenuity. Furthermore, the rear engine mount per se is also thought to be an improvement over the prior art and this mount alone is considered to represent a patentable improvement.

In FIGS. 1 and 2 of the drawing C represents the front end of a motor vehicle chassis frame comprising transversely spaced side rails 10 and 11 that are interconnected by a front end cross member 12 and an intermediate cross member 13. E represents an internal combustion engine that has its front end portion resiliently supported at each side on the spaced side rails 10, 11 by the front engine mounts F, F (see FIGS. 3 and 7). Engine E is drivingly connected through a clutch device 16, that may be a friction clutch, a fluid coupling or a fluid torque converter, to a multi-speed power transmission unit 17. The output shaft of the transmission 17 is connected by a universal joint 18 to a propeller shaft 19 that is adapted to be drivingly connected to the vehicle rear driving wheels (not shown).

The engine mounting system shown in the drawings comprises a three point, floating power suspension system resulting from the pair of transversely spaced, elevated, front engine mounts F, F and the centrally located lower rear engine mount R.

The front engine mounts F, F are identical and therefore only one will be described. Looking particularly at FIGS. 2, 3 and 7, it will be noted that each front mount F comprises a U-shaped, open-ended, bracket piece 21 that has its spaced apart ends connected by bolts 22 to pierced ears 23 formed on the block of the engine E. Mounted within and bonded to the inner side walls of the U-shaped bracket piece 21 are a pair of resilient blocks 25 of rubber-like material (see FIG. 7). Resilient blocks 25 have inserted therebetween and bonded thereto a plate 26. Plate 26 has a bent flange 26a at its lower end that provides a foot for connection to a side rail mounted bracket 27. Bolt 28 anchors the plate foot 26a to the side rails mounted bracket 27. With the front engine mounts F, F as described, it is thought to be obvious that relative vertical movement as well as transverse rocking movement between the engine E and chassis frame C will place the resilient blocks 25, 25 of the front engine mounts F, F in shear whereas fore and aft relative longitudinal movement between the engine E and chassis frame C will place the resilient blocks 25, 25 of front mounts F, F in compression and/or tension respectively. Obviously, combinations of longitudinal and transverse relative movement between the engine E and chassis C will develop shear, compresssion and tension stresses in the resilient blocks 25, 25. The normal gravity load of the engine E will produce shear stresses in the resilient blocks 25 because of the manner in which the blocks 25 are mounted on and connected to their supporting bracket 21 and plate 26. Bracket 27 can be provided with elongated slots 29 (see FIG. 7) so that adjustments can be made in the mountings of the plates 26 on the brackets 27.

The rear engine mount R is shown in detail in FIGS. 4, 5 and 6. It will be noted that the top of the mount R is positioned beneath and connected to the underside of the forward portion of the transmission case 17 by the bolts 31. The lower or under side of the rear mount R is seated upon the shelf-like bracket 32 that has its rear wall portion connected by tabs 33 and 34 to the chassis frame cross member 13 by welds or the like 35. Bracket or support plate 32 has a raised frusto-conical spring seat portion 37 that serves a plurality of purposes. First the frusto-conical projection 37 provides a seating means to receive the lower coils of the compression spring 39. Secondly, the upper end of projection 37 is apertured to receive and seat a resilient bumper ring 41. Bumper ring 41 is grooved around its periphery to receive the portions 42 of the projection 37. Extending vertically through the bore 44 in the resilient bumper block 41 is a shouldered stud bolt 45. Stud bolt 45 has mounted on its lower end, against its head, a stop washer 46. Washer 46 is adapted to engage and seat against the underside of the resilient bumper block 41 after limited upward vertical movement of the bolt 45. The upper end of stud bolt 45 is also shouldered to receive and seat an upper stop washer 48 and a seat plate 49. A nut 50 threaded on the upper end of the bolt 45 maintains the elements 45—49 in assembled relationship. It is thought to be obvious from the foregoing description that the stop washer 48 will engage and seat upon the upper side of the bracket mounted bumper block 41 to limit the amount of downward vertical movement of the bolt 45.

As the bolt 45 is fixedly connected to the seat plate 49, it is clear that upward and downward vertical movement of the seat plate 49 is limited by the engagement of the stop washers 46, 48 with the bumper block 41. Movement of seat plate 49 is also opposed, in a downward vertical direction, by the compression spring 39. The upper end of spring 39 is seated around the downwardly directed, frusto-conical, depression 51 in the seat plate 49 in a manner similar to the seating of the lower end of spring 39 on the upwardly extending, frusto-conical seat projection 37 of the bracket 32. Spring 39, the stop washers 46, 48, and the bumper block 41 provide a first vibration damping means for the rear engine mount R.

Mounted on and connected to the upper side of the seat plate 49 is a second resilient vibration damping means 60 for rear engine mount R. The resilient means 60 comprises an elongated block of rubber-like material that forms a part of a sandwich construction damper that also includes the upper and lower metal plates 61 and 62 respectively that are bonded to the upper and lower sides of the resilient block 60. Resilient block 60 has a pair of vertically extending bores 63 piercing its central portion to receive the head ends of the stud bolts 31. The bolt studs 31 extend through bores in the upper plate 61 and are threadably engaged in bores in the underside of the transmission casing 17. The lower plate 61, of the sandwich-type resilient unit 60—62, has its opposite end portions connected to the seat plate 49 of the spring unit 32, 39, 45, 49, 50 by bolt and nut connectors 65.

From the foregoing description it is thought to be obvious that the rear mount R comprises a pair of series arranged resilient units 39, 60 that preferably have different spring rates. In the preferred form of the invention herein disclosed, the resilient block 60 has a relatively high spring rate and the coil spring 39 has a relatively low spring rate. These resilient units are so designed and arranged on the mount R that the coil spring unit 39 will allow the engine E to pitch freely within a limited middle range or amplitude of movement to absorb the medium frequency drive train vibrations that usually originate at the vehicle highway cruising speeds. The spring 39 will also function to suppress vibrations caused by certain low frequency, small amplitude vibrations that may develop at engine idle speeds and at low vehicle speeds. The resilient block of rubber-like material 60 functions to absorb high frequency, low amplitude and low frequency, large amplitude vibrations of the drive train which the coil spring 39 cannot effectively isolate. The resilient block 60 also acts as a sound insulating means between the vehicle power plant and the chassis frame C.

It will be noted that after limited oscillatory vertical movement of the rear mount seat plate 49 on the coil spring 39, the stop washers 46 or 48 will seat on the resilient bumper block 41 and thereafter vibration damping is accomplished by the compression and expansion of the resilient block elements 60 and 41. Prior to engagement of the stop washers 46 or 48 with the bumper block 41, the major portion of the vibration damping action of the rear mount R is by means of the coil spring 39 although the resilient block 60 is in series with and is free to act in a minor capacity at the same time the spring 39 is acting as the major vibration damping means if the spring rates of the two resilient means 39 and 60 are of the proper values.

From the above explanation it is thought to be clear that neither the coil spring 39 nor the resilient block 60 in and of itself is effective to damp all the various drive train disturbances that originate in a current vehicle drive train. However, by the series arrangement disclosed the two resilient units combine to effectively damp out all of the major disturbances encountered in a current type of motor vehicle drive train.

In addition to the sound insulating and vibration damping action of the rear mount R, it is thought to be obvious that the front mounts F, F will provide both resilient sound insulating and vibration damping means for the disturbance encountered in a drive train. Also, front mounts F, F are designed and arranged to effectively cooperate with the rear mount R to both singly and cooperatively provide the optimum type of mount for a motor vehicle power plant and drive train.

While the resilient front and rear engine mounts F, F and R respectively provide the damped floating action necessary for optimum vibration isolation, still, the constructions shown are so designed that they will fail safe in the event any of the resilient units should deteriorate during use.

We claim:
1. A vibration absorbing mounting for the output end of power plants and the like comprising a bracket adapted to be mounted on a supporting frame, said bracket having an upstanding, annular projection providing a coil spring seat, a coil spring mounted around said spring seat for free vertical oscillatory movement, a seat plate mounted on said coil spring, a stem with axially spaced apart stop means thereon depending from and rigidly connected to said seat plate, a sound absorbing bumper means fixedly carried by said coil spring seat and positioned between and in normally spaced relation to said spaced stop means to limit the free oscillatory compression and expansion movement of said coil spring, and a resilient rubber-like block of material mounted on said seat plate and arranged in series with said coil spring to cooperate therewith in the damping of vibrations transmitted to said mounting, said coil spring and said resilient rubber-like block having different deflection rates to provide for damping vibrations over a wide frequency range.

2. A vibration absorbing mounting for power plants and the like comprising a bracket adapted to be mounted on a supporting frame, said bracket having a raised, annular coil spring seat thereon, a coil spring mounted on said bracket seat for free, vertical, oscillatory movement, a seat plate mounted on said coil spring, spaced apart stop means depending from and rigidly connected to said seat plate, a sound absorbing bumper means fixedly carried by said spring seat and positioned between and in normally spaced relation to said spaced stop means to limit the free oscillatory compression and expansion movement of said coil spring, and a resilient rubber-like block of material mounted on said seat plate and arranged in series with said coil spring to cooperate therewith in the damping of vibrations transmitted to said mounting, said coil spring and said block of resilient material being of different spring rates.

3. A vibration absorbing mounting for the output end of power plants and the like comprising a bracket adapted to be mounted on the power plant supporting frame, said bracket having a vertically offset, ring-like coil spring seat thereon, a coil spring mounted on said bracket seat for free vertical oscillatory movement, a seat plate mounted on said coil spring, spaced apart stop means depending from and rigidly connected to said seat plate, a sound absorbing bumper means fixedly carried by said spring seat and positioned between and in normally spaced relation to said spaced stop means to limit the free oscillatory compression and expansion movement of said coil spring, and a resilient rubber-like block of material mounted on said seat plate and arranged in series with said coil spring to cooperate therewith in the damping of vibrations transmitted to said mounting, said coil spring and said block of resilient material being of different spring rates and said stop means being arranged such that said coil spring functions to damp vibrations in certain frequency ranges and said resilient block functions to damp vibrations in other frequency ranges.

4. In a vibration damping mount for the output end of an engine or the like, a bracket adapted to be mounted on a support, said bracket having an upstanding coil spring seat thereon, a compression-type coil spring mounted concentrically about said spring seat and projecting upwardly thereabove for free, vertical, oscillation, an aperture through said spring seat, a sound absorbing resilient bumper ring mounted on said spring seat and lining the aperture therein, a seat plate mounted on the top of said coil spring having a depressed spring seat positioned within the upper portion of said coil spring and spaced from said bumper ring, a stud extending through the aperture in the bumper ring having stop members along its shank portion spaced from and arranged on opposite sides of the bumper ring with said stud being fixedly connected to said seat plate so as to limit the free, vertical, oscillation of the coil spring, and a resilient block of rubber-like material mounted on said seat plate in series arrangement with said coil spring, said coil spring and said block of resilient material having different deflection rates.

5. In a vibration damping mount for an engine or the like, a rear engine mount adjacent the engine output member comprising a bracket adapted to be mounted on a support, said bracket having an upstanding coil spring seat thereon, a compression-type coil spring mounted concentrically about said spring seat and projecting upwardly thereabove, an aperture through said spring seat, a sound absorbing resilient bumper ring mounted on said seat and lining the aperture therein, a seat plate mounted on the top of said coil spring, a stud extending through the aperture in the bumper ring having stop members spaced from and arranged on opposite sides of the bumper ring with said stud being fixedly connected to said seat plate and a resilient block of rubber-like material mounted on said seat plate in series arrangement with said coil spring and a front engine mount comprising an open-ended, U-shaped bracket adapted to be mounted on a support, a plate adapted to be mounted on a front portion of the engine and to extend between the spaced legs of the U-shaped bracket, and blocks of resilient, rubber-like material connected between said plate and said U-shaped bracket to resist the gravity load of the engine in shear and the fore and aft engine movement in compression.

References Cited in the file of this patent

UNITED STATES PATENTS

| | | |
|---|---|---|
| 1,956,108 | Symington | Apr. 24, 1934 |
| 1,957,218 | Lee | May 1, 1934 |
| 2,397,804 | Nakken | Apr. 2, 1946 |
| 2,660,387 | Roy | Nov. 24, 1953 |
| 2,689,014 | Wallinger | Sept. 14, 1954 |
| 2,903,228 | Neher | Sept. 8, 1959 |